United States Patent Office 3,135,699
Patented June 2, 1964

3,135,699
PROCESS FOR REGENERATING A
HYDROGENATION CATALYST
Hans Herzog, Konstanz, and Gerhard Käbisch, Rheinfelden, Germany, assignors, by mesne assignments, to FMC Corporation, New York, N.Y., a corporation of Delaware
No Drawing. Filed Apr. 20, 1961, Ser. No. 104,252
Claims priority, application Germany Apr. 23, 1960
5 Claims. (Cl. 252—412)

This invention relates to the regeneration of hydrogenation catalysts.

Catalysts employed in the hydrogenation of such compounds as the anthraquinones and their alkylated derivatives, styrene, and the like, gradually lose their catalytic activities upon repeated use. As these catalysts are expensive, normally comprising such materials as palladium or platinum, the over-all cost of a hydrogenation process is increased substantially wherever the catalyst becomes exhausted and it must be discarded. It therefore is highly desirable to have a simple and economical means of restoring the initial activity of the catalyst, that is regenerating it, in order that it can be reused in the process.

Regeneration of supported catalysts of large particle size, on the order of 2 to 60 mesh, can be accomplished readily by such methods as burning or otherwise removing impurities from the catalyst particles. However, such simple methods have not been found applicable to suspension catalysts, which must be small, on the order of 60 mesh to .1 micron or even smaller, in order to be suspended successfully in hydrogenation medium. It has been necessary with these small catalysts either to resort to complex regeneration methods, or to convert the catalyst chemically to its elements and recover these elements for subsequent use.

The hydrogenation stage of the anthraquinone process for producing hydrogen peroxide is a typical example of an application of suspended catalysts. An anthraquinone is dissolved in a solvent, and hydrogenated in the presence of a catalyst such as palladium or platinum to the corresponding anthrahydroquinone, which subsequently may be oxidized to produce hydrogen peroxide and reform the anthraquinone. While the catalyst for hydrogenation may be employed in a fixed bed, in which case it will be of large particle size, it is often desired to conduct the hydrogenation reaction in the presence of a catalyst suspended in the reaction medium.

Raney-nickel has been employed as a suspension catalyst for this reaction, and has the advantage of low cost. However, it is highly susceptible to deactivation, and is not properly selective in its catalytic effect. Moreover, no commercially effective means is known for regenerating the catalyst economically once it has lost its initial effectiveness. For these reasons, platinum, palladium and the other noble metals have been recommended for use in the hydrogenation of anthraquinones. These metals can be employed in finely divided form either alone or on a support having a sufficiently small particle size to provide for suspension.

It is apparent that use of the more expensive noble metal catalysts is only practical if they can be regenerated economically and simply once they have become deactivated. Various attempts have been made to develop methods of regenerating these catalysts, as reported in U.S. Patent No. 2,692,240, German Patent No. 1,051,257 and British Patent No. 787,340. The processes recited in these patents suffer the disadvantages that they are either specific to certain special catalysts or that they are not efficient, and a generally applicable and efficient method of regenerating noble metal hydrogenation catalysts has been sought.

It has now been found, quite surprisingly, that noble metal hydrogenation catalysts which have become deactivated upon use, can be regenerated efficiently to a high activity by simply treating them with liquid ammonia. By this treatment essentially the full initial activity of the catalyst can be revived by simple means, without complete breakdown and reforming of the catalyst. The effectiveness of the ammonia in regeneration of noble metal catalysts is particularly suprising in view of the fact that Raney-nickel suspension catalysts are poisoned, and lose their catalytic activity completely, upon being contacted with liquid ammonia.

The regeneration is preceded by separation of the catalyst particles from the organic solvent in the system, for example by filtering, normally followed by removal of any remaining traces of organic chemicals on the catalyst by extraction in a liquid organic solvent such as acetone, and drying of the catalyst. The catalyst, which preferably has been pretreated by this means, is subjected to extraction with liquid ammonia at a low temperature at which ammonia is liquid. The pretreatment with organic solvent is desirable, but in many cases can be avoided.

After extraction with ammonia the catalyst may be freed of any residual ammonia and be used directly in the hydrogenation reaction. Removal of the residual ammonia is not essential, however, as it serves to increase the activity of the catalysts in some hydrogenation reactions. The liquid ammonia can be replaced in the process, if desired, with gaseous ammonia or highly concentrated aqueous ammonia.

A preferred technique for carrying out the treatment of the present invention comprises placing deactivated catalyst in a filter candle and inserting the candle in order into a solvent extraction device such as a Soxhlet extractor, a drier, a liquid ammonia extraction device, and an evaporator. This sequence of operations is readily conducted, and functions well in simple equipment.

The catalysts which may be regenerated in accordance with the present method are the noble metal catalysts, namely, palladium, platinum, ruthenium, rubidium and rhodium. The catalysts can be employed supported on a carrier of sufficiently small particle size, for example alumina, silica gel, carbon, magnesium carbonate, dolomite and the like to provide a catalyst particle of about 60 mesh to .1 micron in size. More frequently, however, the catalysts are employed in the indicated particle size unsupported by any carrier, for example, as palladium black or platinum black, having a particle size of 0.1 to 50 microns.

Catalysts can be regenerated effectively by the present method a number of times. However, the effectiveness of the procedure drops off after on the order of 20 regenerations, and thereafter the catalysts should be recovered by chemical means, such as conversion of the palladium catalyst to palladium chloride and reforming of the palladium from this intermediate.

The amount of liquid ammonia used is not critical, but normally for efficient practice will be about 10 to 50 parts by volume for each part by weight of catalyst. The time of treatment likewise is not critical, the extent of regeneration determining when to stop the treatment.

The following examples of regeneration of noble metal catalysts by the present method are presented to demonstrate the regeneration of palladium and platinum. However, the process can be applied effectively with other noble metals, and the hydrogenation reaction in turn may comprise other reactions than conversion of anthraquinone to anthrahydroquinone and hydrogenation of styrene.

Example 1

200 g. of $(NH_4)_2PtCl_6$ was reduced by hydrogen at a temperature of about 80° to 100° C. in a combustion furnace. The heating was continued until $NH_4Cl$ was no longer liberated, at which time platinum black had been produced. The platinum black was cooled, and washed with water until chlorine ions were no longer detectable in the wash water. Thereupon the black was dried over $P_2O_5$, to provide an almost quantitative yield.

(a) 100 ml. of a solution comprising 10% by weight of ethylanthraquinone, 45% by weight of methylnaphthalene, and 45% by weight of octyl alcohol was poured into a 250 cc. stirring flask, in which the solution was mixed with stirring with 50 mg. of the platinum black prepared as described above. The flask was then connected with a source of hydrogen, and hydrogen was passed into the stirring mixture. The activity of the platinum black at 20° C., the temperature at which the reaction was conducted, was determined to be 58, in terms of ml. of hydrogen gas absorbed per minute by the solution.

(b) 90 ml. of a solution of ethylanthraquinone, methylnaphthalene and octyl alcohol in the above proportions, was employed in a recycling system for the production of hydrogen peroxide by the anthraquinone process. In this system the working solution was treated in the hydrogenation stage to convert the ethylanthraquinone to the ethylanthrahydroquinone, and thereafter oxidized to produce hydrogen peroxide and ethylanthraquinone, following which the hydrogen peroxide was washed from the solution with water and the solution of ethylanthraquinone in the indicated solvents was recycled to the hydrogenation stage.

The catalyst was employed in the hydrogenation stage in the amount of 12 g. of platinum black per liter of working solution.

The reaction was run for 5 days, until the activity of the platinum black was reduced to a value of 2.5, at which point it was essentially exhausted. Thereafter, the catalyst was filtered from the solution, and poured into a 7 liter filter candle, and the candle was inserted in a distillation receiver having a return line to the still. The still contained 90 liters of acetone, which was distilled and condensed, thereby washing out the platinum black. This extraction was discontinued after 5 hours and the acetone-moist platinum black dried in a drying chamber. The filter candle containing the platinum black was then washed with liquid ammonia in a Soxhlet extractor in which the liquid ammonia was at a temperature of −80° C., and was used in the amount of 30 liters for the 1080 grams of catalyst treated. The treatment was run for 4 hours. A 50 mg. sample of the treated catalyst had an activity of 59, as determined by the method described above.

Example 2

5 g. of palladium chloride was dissolved with stirring at 80 to 90° C. in 1 liter of water containing 5 ml. of concentrated hydrochloric acid. The pH of the resulting solution was brought to 3.5 with a 20% aqueous sodium hydroxide; the solution converted to a dark brown color, remaining clear. It was then mixed with 0.55 ml. of 98 to 100% formic acid, allowed to stand for 5 minutes, and brought to a pH of 9 rapidly with 20% sodium hydroxide. Immediately thereafter, it was mixed with 1.1 ml. of 98 to 100% formic acid and again brought to a pH of 9 with 20% sodium hydroxide.

Black flakes of palladium black separated at the end of this treatment, which was conducted throughout with stirring at a temperature of about 80 to 85° C. The solution was permitted to stand with intermittent stirring over a period of one-half hour at this temperature. Thereafter, the clear solution above the precipitated black particles was decanted, the decantate mixed with hot water, and recovered black returned to the bulk of the material. The black was then washed with water until the wash water was neutral, with care being taken to see that the black remained covered with water at all times. Thereafter, the black sponge product was then placed in a dish and dried in a vacuum over $P_2O_5$. About 3 g. of product was obtained.

The activity of the palladium black material produced by this means was measured according to the above method, the activity of a 50 ml. sample being 120.

A palladium black catalyst prepared by this method and having this activity was employed in the anthraquinone process for producing hydrogen peroxide described above, in this case the catalyst being employed in the amount of 6 g. per liter of working solution. Following 5 days of treatment, the black had lost its catalytic activity, having a value of 5. It was then subjected to a liquid ammonia treatment, as described in Example 1, with the result that it was returned to an activity of 118.

Example 3

A 50 ml. sample of palladium black, having an activity of 130, was employed as a catalyst for the hydrogenation of 100 ml. of styrene. In this reaction, the activity of the catalyst was decreased to 10, and upon regeneration by the method described in Example 1, was returned to an activity of 131.

Example 4

In this case, a catalyst comprising palladium on activated alumina, and having a particle size of 200 mesh, was employed as described in Example 1(b) as a catalyst in the hydrogenation of ethylanthraquinone. Initially, the catalyst had an activity of 80, which was decreased to 20 upon hydrogenation. Reactivation with liquid ammonia according to the process of Example 1 returned the activity to 72.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Process of regenerating a deactivated hydrogenation suspension catalyst comprising a noble metal, in which said deactivated catalyst is treated with liquid ammonia at a low temperature at which ammonia is liquid until the catalytic activity of the treated catalyst is improved.

2. Process of claim 1 in which the catalyst comprises palladium.

3. Method of claim 1 in which the catalyst comprises platinum.

4. Process of regenerating a palladium hydrogenation catalyst which has been employed in suspension to catalyze the hydrogenation of an anthraquinone in the anthraquinone process of producing hydrogen peroxide and has been deactivated thereby, in which said catalyst is treated with liquid ammonia at a low temperature at which ammonia is liquid until the catalytic activity of the treated catalyst is improved.

5. Method of claim 4 in which the hydrogenation catalyst is a platinum hydrogenation catalyst.

References Cited in the file of this patent

UNITED STATES PATENTS

| | | |
|---|---|---|
| Re. 22,097 | Wells | May 10, 1942 |
| 1,985,343 | Connolly et al. | Dec. 25, 1934 |
| 2,925,391 | Lait et al. | Feb. 16, 1960 |
| 3,082,059 | Goren | Mar. 19, 1963 |